(12) United States Patent
Tanabe et al.

(10) Patent No.: US 8,508,492 B2
(45) Date of Patent: *Aug. 13, 2013

(54) TOUCH PANEL AND METHOD OF DETECTING PRESS OPERATION POSITION THEREON

(75) Inventors: Koji Tanabe, Osaka (JP); Hirotoshi Watanabe, Osaka (JP); Hidetoshi Hiraoka, Osaka (JP); Kenichi Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 650 days.

This patent is subject to a terminal disclaimer.

(21) Appl. No.: 12/768,203

(22) Filed: Apr. 27, 2010

(65) Prior Publication Data

US 2010/0207907 A1    Aug. 19, 2010

Related U.S. Application Data

(63) Continuation-in-part of application No. 12/685,143, filed on Jan. 11, 2010, which is a continuation-in-part of application No. 12/685,157, filed on Jan. 11, 2010.

(30) Foreign Application Priority Data

| Jan. 19, 2009 | (JP) | 2009-008582 |
| Jan. 19, 2009 | (JP) | 2009-008585 |
| Apr. 3, 2009 | (JP) | 2009-091060 |
| May 14, 2009 | (JP) | 2009-117469 |
| Jun. 4, 2009 | (JP) | 2009-134854 |

(51) Int. Cl.
    *G06F 3/041*     (2006.01)

(52) U.S. Cl.
    USPC .................................. 345/173; 345/174

(58) Field of Classification Search
    USPC .................................................. 345/173–174
    See application file for complete search history.

(56) References Cited

U.S. PATENT DOCUMENTS

| 5,181,030 A | * | 1/1993 | Itaya et al. | 341/20 |
| 5,680,160 A | * | 10/1997 | LaPointe | 345/173 |
| 7,439,466 B2 | | 10/2008 | Yamaue et al. | |
| 7,825,905 B2 | * | 11/2010 | Philipp | 345/173 |
| 2010/0079389 A1 | * | 4/2010 | Liu et al. | 345/173 |

FOREIGN PATENT DOCUMENTS

| CN | 101339481 | 1/2009 |
| JP | 61-84730 | 4/1986 |
| JP | 61-74137 | 5/1986 |
| JP | 2007-310440 | 11/2007 |

* cited by examiner

*Primary Examiner* — Alexander Eisen
*Assistant Examiner* — Robin Mishler
(74) *Attorney, Agent, or Firm* — Wenderoth, Lind & Ponack, L.L.P.

(57) ABSTRACT

In a touch panel, one of conductive layers on a bottom of an upper substrate and on a top of a lower substrate is formed of belt-shaped conductive layers. The other is a single conductive layer facing the belt-shaped conductive layers. The single conductive layer is provided with a pair of electrodes in positions corresponding to both ends in a direction where the belt-shaped conductive layers extend. When the upper substrate is pressed while a voltage is applied between the pair of electrodes, the top and lower conductive layers contact with each other. Then, a voltage value corresponding to the pressed position in the direction where the belt-shaped conductive layers extend is generated from any of the belt-shaped conductive layers. From the voltage value and the position of the belt-shaped conductive layer from which the voltage value is generated, a pressed position on the upper substrate can be detected.

1 Claim, 18 Drawing Sheets

FIG. 7
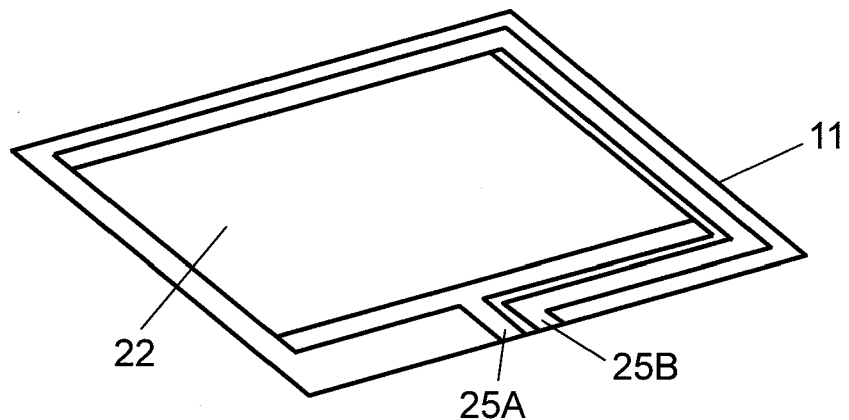
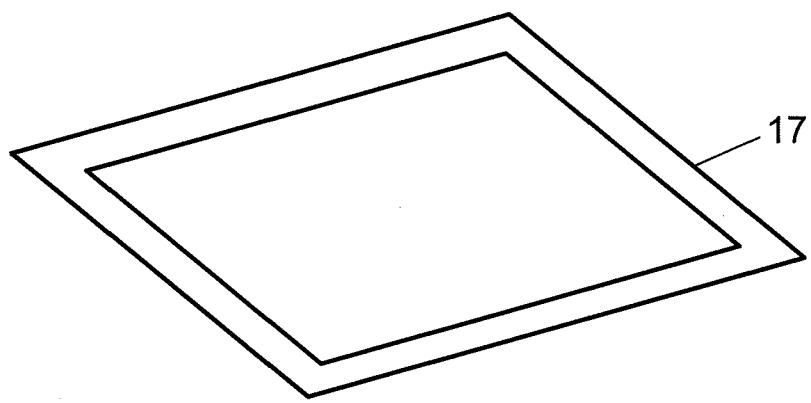
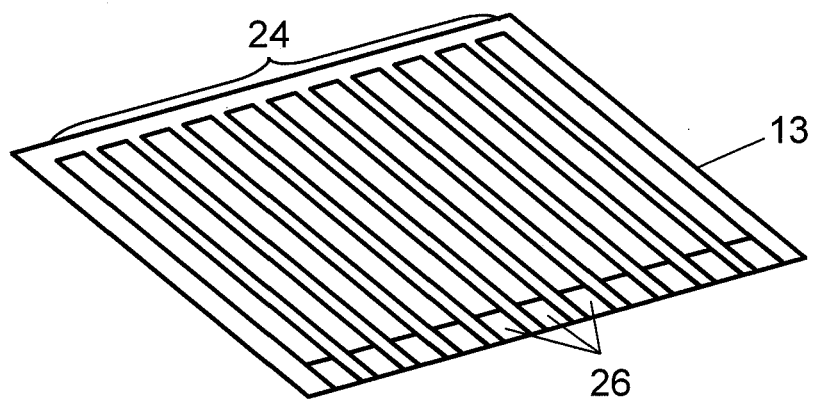

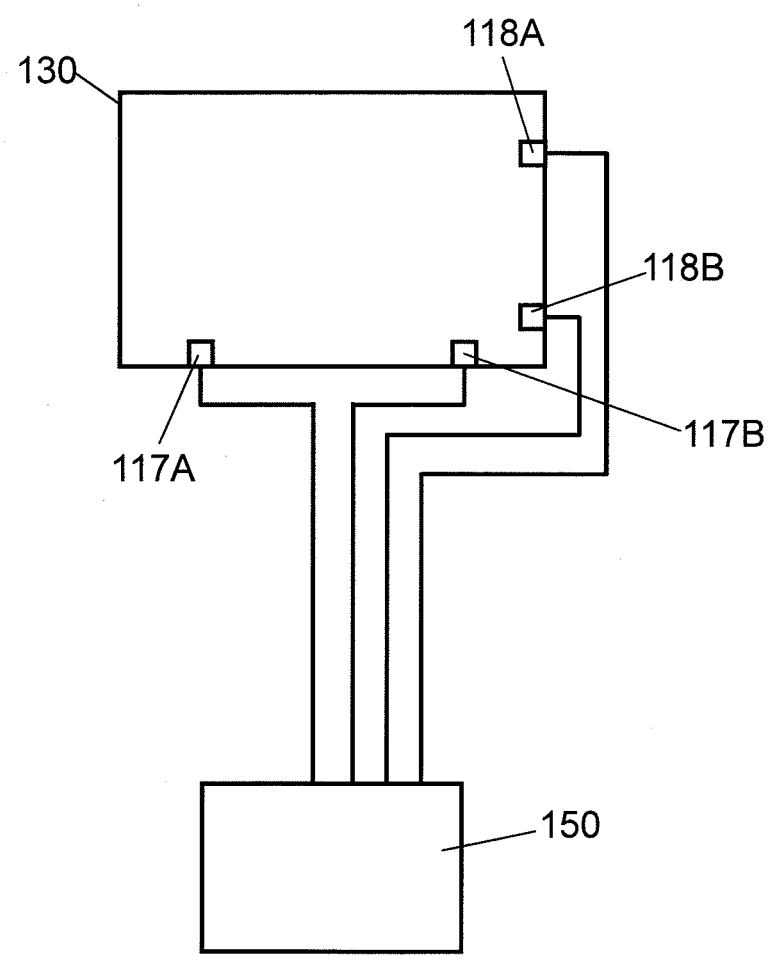

TOUCH PANEL AND METHOD OF DETECTING PRESS OPERATION POSITION THEREON

This application is a Rule 1.53(b) Continuation-In-Part of U.S. application Ser. No. 12/685,143, filed Jan. 11, 2010 and U.S. application Ser. No. 12/685,157, filed Jan. 11, 2010.

BACKGROUND OF THE INVENTION

1. Field of the Invention

The present invention relates to a touch panel mainly used for operating various kinds of electronic equipments and a method of detecting a press operation position thereon.

2. Background Art

Recently, various kinds of electronic equipments such as a portable telephone and an electronic camera have advanced in functions and become diversified. Along with this, the number of equipments in which a light-transparent touch panel is mounted on the front surface of a liquid crystal display device or the like is increasing. A user operates by pressing a touch panel with a finger thereof, a pen, or the like, while viewing the indication on a display device at the back of the touch panel. According to this operation, various functions of equipment can be switched from one function to another. Such a conventional touch panel is described with reference to FIG. 19. FIG. 19 is a sectional view showing a conventional touch panel. Note here that the drawing is shown in an enlarged size partially so that the configuration can be understood easily.

This touch panel includes film-shaped light-transparent upper substrate 1, light-transparent lower substrate 2 made of glass or the like, frame-shaped spacer 5 disposed on the inner edge of the outer periphery of upper substrate 1 and lower substrate 2 therebetween. Light-transparent upper conductive layer 3 is formed in a substantially rectangular shape on a substantially entire surface of the bottom surface of upper substrate 1. Light-transparent lower conductive layer 4 is formed on a substantially entire surface of the top surface of lower substrate 2. A plurality of dot spacers (not shown) made of insulating resin are formed on the top surface of lower conductive layer 4 with a predetermined interval. A pair of upper electrodes (not shown) are formed on both ends of upper conductive layer 3, and a pair of lower electrodes (not shown) are formed on both ends of lower conductive layer 4 in the direction perpendicular to the upper electrodes.

On the top and bottom surfaces of spacer 5, an adhesive agent (not shown) is coated. Upper substrate 1 and lower substrate 2 are attached together at their outer peripheries with the adhesive agent. Upper conductive layer 3 and lower conductive layer 4 face each other with a predetermined gap therebetween, and thus the touch panel is formed. The thus formed touch panel is disposed on the front surface of a display device and mounted on electronic equipment. The pairs of the top and lower electrodes are electrically connected to an electronic circuit (not shown) of the equipment.

When a user presses a top surface of upper substrate 1 to operate the touch panel by a finger, a pen, or the like in response to an indication on the display device at the back of the touch panel, upper substrate 1 bends downward, causing upper conductive layer 3 at the pressed place to be brought into contact with lower conductive layer 4. The electronic circuit applies a voltage to the upper electrodes and the lower electrodes sequentially. The electronic circuit detects the pressed place by a ratio of the voltages between the respective pair of electrodes, and thereby switches various functions of equipment.

That is to say, a user presses the top surface of upper substrate 1 in a position on a desired menu in a state in which a plurality of menus, or the like, are displayed on the display device at the back of the touch panel. The electronic circuit detects the operated position by a ratio of the voltage between the upper electrodes and the voltage between the lower electrodes, thereby selecting a desired menu from a plurality of menus.

As mentioned above, the pair of upper electrodes are provided on both ends of the substantially rectangular-shaped upper conductive layer 3 provided on the bottom surface of upper substrate 1. The pair of lower electrodes are provided on both ends in the direction perpendicular to the upper electrodes of similarly substantially rectangular-shaped lower conductive layer 4 on the top surface of lower substrate 2. The electronic circuit detects the pressed place by a ratio of the voltages between the respective pair of electrodes. Therefore, the electronic circuit can detect only one pressed position. For example, when a user presses the position shown by arrow M by one finger and simultaneously presses the position shown by arrow N by another finger, the electronic circuit cannot detect these two pressed positions simultaneously.

In order to detect the pressed positions in such a state, for example, a touch panel has been devised in which upper conductive layer 3 and lower conductive layer 4 are formed of a plurality of conductive layers in a substantially belt shape instead of a substantially rectangular shape and they are allowed to cross in the direction perpendicular to each other and to face each other with a predetermined gap therebetween. By applying a voltage to these conductive layers sequentially, a plurality of pressed positions can be detected. In this case, the formation of a touch panel generally needs several to several tens of conductive layers although it depends on the size of a touch panel.

In the case where a plurality of top and lower conductive layers are provided in this way, several tens of top and lower electrodes are required for the connection from respective conductive layers to an electronic circuit. Therefore, the entire outer shape becomes larger. Moreover, since it is necessary to detect a pressed position by sequentially applying a voltage to all of the electrodes, it takes a long time to detect a position. The connection to an electronic circuit and arithmetic processing for detecting a position become complicated.

SUMMARY OF THE INVENTION

A touch panel of the present invention includes a light-transparent upper substrate, a light-transparent lower substrate, and a frame-like spacer. An upper conductive layer is formed on a bottom surface of the upper substrate, and a lower conductive layer, facing the upper conductive layer with a predetermined gap therebetween, is formed on a top surface of the lower substrate. The spacer is interposed between the upper substrate and the lower substrate. The touch panel has any one of the following configurations. (1) The upper conductive layer is formed of a plurality of belt-shaped conductive layers. On each end portion of the belt-shaped conductive layers, one of upper electrodes is provided. The lower conductive layer is formed of a single conductive layer facing all of the belt-shaped conductive layers, and is provided with a pair of lower electrodes in positions, which corresponds to both ends in a direction in which the belt-shaped conductive layers extend. (2) The lower conductive layer is formed of a plurality of belt-shaped conductive layers. On each end portion of the belt-shaped conductive layers, one of lower electrodes is provided. The upper conductive layer is formed of a single conductive layer facing all of the plurality of belt-shaped conductive layers, and is provided with a pair of lower electrodes, which correspond to both ends in a direction in which the belt-shaped conductive layers extend.

In the configuration of (1), when the upper substrate is pressed and the upper conductive layer and the lower conductive layer are brought into contact with each other in a state in which a voltage is applied between the pair of lower electrodes, a voltage corresponding to the pressed position in a direction in which the belt-shaped conductive layers extend is generated from any of the belt-shaped conductive layers. Based on this voltage value and the position of the belt-shaped conductive layer where the voltage is detected, the pressed position on the upper substrate is detected.

In the configuration of (2), when the upper substrate is pressed and the upper conductive layer and the lower conductive layer are brought into contact with each other in a state in which a voltage is applied between the pair of upper electrodes, a voltage corresponding to the pressed position in a direction in which the belt-shaped conductive layers extend is generated from any one of the belt-shaped conductive layers. Based on this voltage value and the position of the belt-shaped conductive layer where the voltage is detected, the pressed position of the upper substrate is detected.

That is to say, only by detecting a voltage on the belt-shaped conductive layer, the pressed position can be detected. Moreover, even when a plurality of places are pressed, each of the pressed positions can be detected in a case the pressed positions correspond to different belt-shaped conductive layers. Furthermore, the number of electrodes can be reduced, thus preventing the entire outer shape from being increased. At the same time, connection to an electronic circuit and arithmetic processing for detecting positions can be simplified.

Another touch panel of the present invention includes a upper substrate, a plurality of belt-shaped upper conductive layers, a upper resistive layer, first and second upper electrodes, a lower substrate, a plurality of belt-shaped lower conductive layers, a lower resistive layer, first and second lower electrodes, and a frame-shaped spacer. The upper conductive layers are formed on the bottom surface of the light-transparent upper substrate. The upper resistive layer connects the upper conductive layers at end portions of the upper conductive layers. The first and second upper electrodes are respectively provided on both ends of the upper resistive layer. The lower conductive layers are formed on the top surface of the light-transparent lower substrate, and face the upper conductive layers with a predetermined gap therebetween, and extend in a second direction intersecting an extending direction of the upper conductive layers. The lower resistive layer connects the lower conductive layers at end portions of the lower conductive layers. The first and second lower electrodes are provided on both ends of the lower resistive layer. The spacer is interposed between the upper substrate and the lower substrate.

In this configuration, a voltage is applied to between the first and second upper electrodes, and a voltage value at the first lower electrode is detected. A voltage is then applied to between the first and second lower electrodes, and a voltage value at the first upper electrode is detected. Based on these voltage values, it is possible to detect a pressed position in the direction in which the upper conductive layers are arranged and in the direction in which the lower conductive layers are arranged, respectively. Furthermore, by detecting a voltage value at the second lower electrode when a voltage is applied between the first and second upper electrodes, and by detecting a voltage value at the second upper electrode when a voltage is applied between the first and second lower electrodes, two pressed positions can be detected.

BRIEF DESCRIPTION OF THE DRAWINGS

FIG. 7 is an exploded perspective view of another touch panel in accordance with the first embodiment of the present invention.

FIG. 13 is a diagram showing a connection between the touch panel shown in FIG. 11 and an electronic circuit.

DETAILED DESCRIPTION OF THE INVENTION

Hereinafter, an embodiment of the present invention is described with reference to drawings. The drawings are shown in an enlarged size partially so that configurations can be understood easily.

First Exemplary Embodiment

Figure 1:
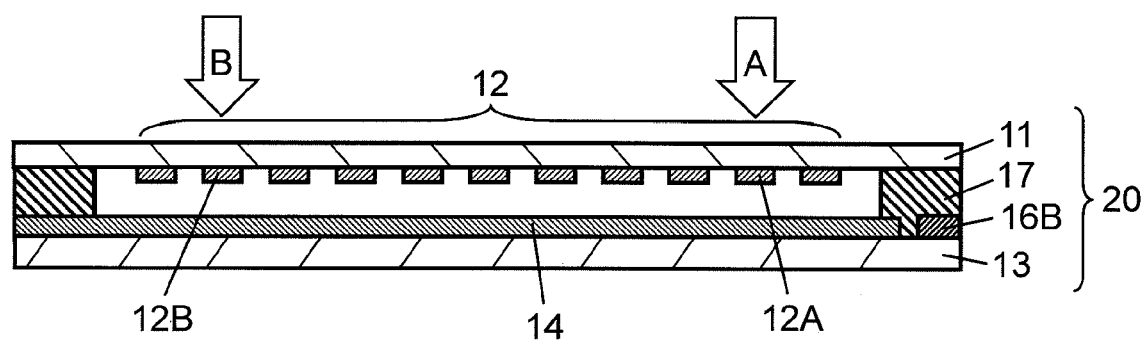
FIG. 1 is a sectional view of a touch panel in accordance with a first embodiment of the present invention.
Figure 2:
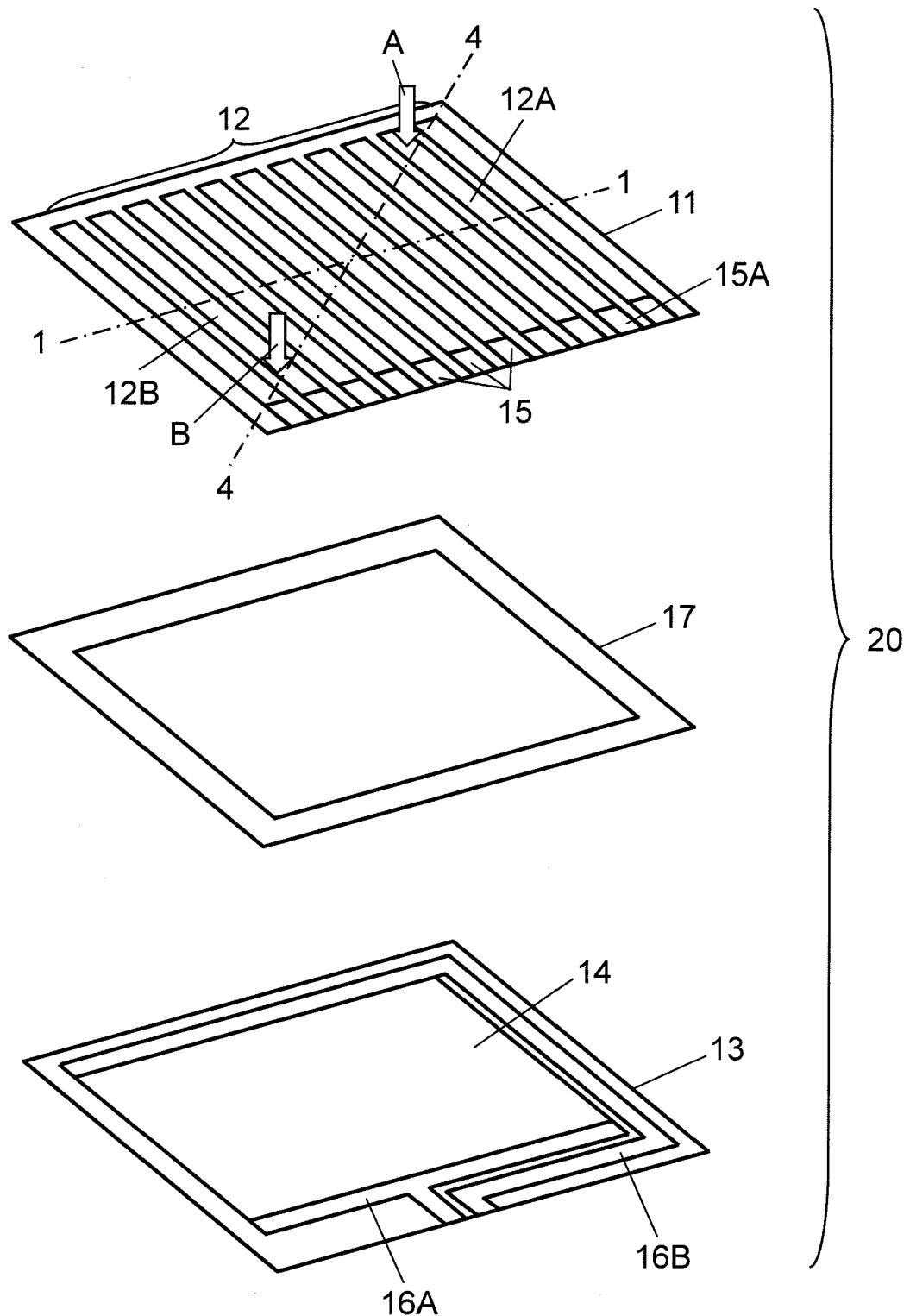
FIG. 2 is an exploded perspective view of the touch panel shown in FIG. 1.
Figure 3:
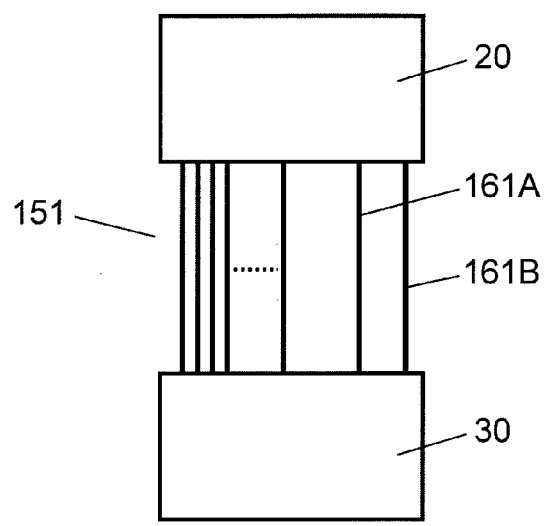
FIG. 3 is a diagram showing a connection between the touch panel shown in FIG. 1 and an electronic circuit.
Figure 4:
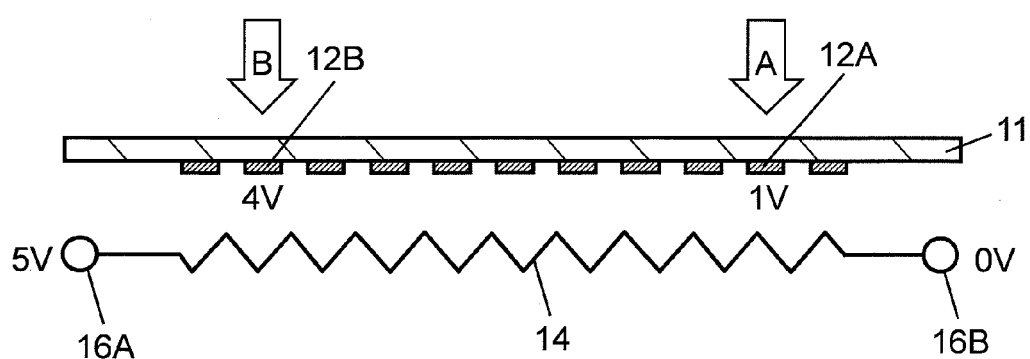
FIG. 4 is a conceptual view in a cross section taken on line 4-4 in FIG. 2.

FIGS. 1 and 2 are a sectional view and an exploded perspective view of a touch panel in accordance with a first embodiment of the present invention. FIG. 1 shows a cross section taken on line 1-1 shown in FIG. 2. FIG. 3 is a diagram showing a connection between the touch panel and an electronic circuit. FIG. 4 is a conceptual view in a cross section taken on line 4-4 in FIG. 2. Touch panel 20 includes upper substrate 11, lower substrate 13 and spacer 17.

Light-transparent upper substrate 11 is made of light-transparent resin such as polyethylene terephthalate, polyether sulphone, and polycarbonate. Light transparent upper conductive layer 12 made of indium tin oxide, oxide tin, or the like, is formed on the bottom surface of upper substrate 11 by sputtering or the like. Upper conductive layer 12 is formed of belt-shaped conductive layers 12A, 12B and the other belt-shaped conductive layers, each formed in a width of about 0.3-2 mm with an interval of about 0.6-4 mm. On the end portion of each belt-shaped conductive layer, one of upper electrodes 15 made of silver, carbon, or the like, is provided. FIG. 2 shows a transparent view of upper substrate 11.

Light-transparent lower substrate 13 is made of glass, acrylic, polycarbonate, or the like. Rectangular-shaped light-transparent lower conductive layer 14 made of indium tin oxide, tin oxide, or the like, is formed on the top surface of lower substrate 13 by sputtering or the like. Lower conductive layer 14 is formed of a single conductive layer having a size that faces all of the belt-shaped conductive layers provided on upper substrate 11.

A plurality of dot spacers (not shown) made of insulating resin such as epoxy resin and silicone resin are formed on the top surface of lower conductive layer 14 with a predetermined interval. A pair of lower electrodes 16A and 16B are formed on the front and rear ends of lower conductive layer 14, respectively. That is to say, lower conductive layer 14 is provided with lower electrodes 16A and 16B in positions which correspond to both ends in the direction in which the belt-shaped conductive layers extend.

Spacer 17 is made of polyester, epoxy resin, non-woven fabric, or the like, and is formed in a shape of a frame on the inner edge of the outer periphery between upper substrate 11 and lower substrate 13. An adhesive agent (not shown) such as acrylic agent or rubber agent is coated on either or both of the top and bottom surfaces of spacer 17. With this adhesive agent, upper substrate 11 and lower substrate 13 are attached to each other at their outer peripheries thereof, so that upper conductive layer 12 faces lower conductive layer 14 with a predetermined gap therebetween. That is to say, frame-like spacer 17 is interposed between upper substrate 11 and lower substrate 13.

Thus formed touch panel 20 is disposed on the front surface of, for example, a liquid crystal display device and is mounted on electronic equipment. Upper electrodes 15 and lower electrodes 16A and 16B are electrically connected to electronic circuit 30 of the electronic equipment. Wiring 151 is connected to each of upper electrodes 15 and wirings 161A and 161B are connected to lower electrodes 16A and 16B, respectively.

In the above configuration, a user operates to press a place on the top surface of upper substrate 11, for example, a place shown by arrow A, by a finger, a pen, or the like, in response to the indication on the display device disposed at the back of touch panel 20. According to this operation, upper substrate 11 bends downward, causing belt-shaped conductive layer 12A of the pressed place to be brought into contact with lower conductive layer 14. At this time, electronic circuit 30 applies a voltage to the both ends of lower conductive layer 14 via lower electrodes 16A and 16B. For example, electric circuit 30 applies a voltage of 5 V between lower electrodes 16A and 16B. In this case, for example, a voltage of 1 V is detected from belt-shaped conductive layer 12A. Based on the voltage value, electric circuit 30 detects a position of arrow A in the front-rear direction. That is to say, electronic circuit 30 detects the pressed position on upper substrate 11 in the direction in which each belt-shaped conductive layer of upper conductive layers 12 extends, based on the voltage value detected from upper electrode 15A among upper electrodes 15.

Furthermore, electronic circuit 30 detects that belt-shaped conductive layer 12A from which the voltage is detected is, for example, the second from the right in upper conductive layer 12. According to this detection, electronic circuit 30 detects the position of arrow A in the right-left direction. That is to say, electronic circuit 30 detects the pressed position on upper substrate 11 in the direction in which the belt-shaped conductive layers are arranged, based on the position of belt-shaped conductive layer 12A connected to upper electrode 15A from which the voltage is detected among upper electrodes 15. In this way, the pressed positions of arrow A in the front-rear direction and in the right-left direction are detected, respectively.

Figure 5A:
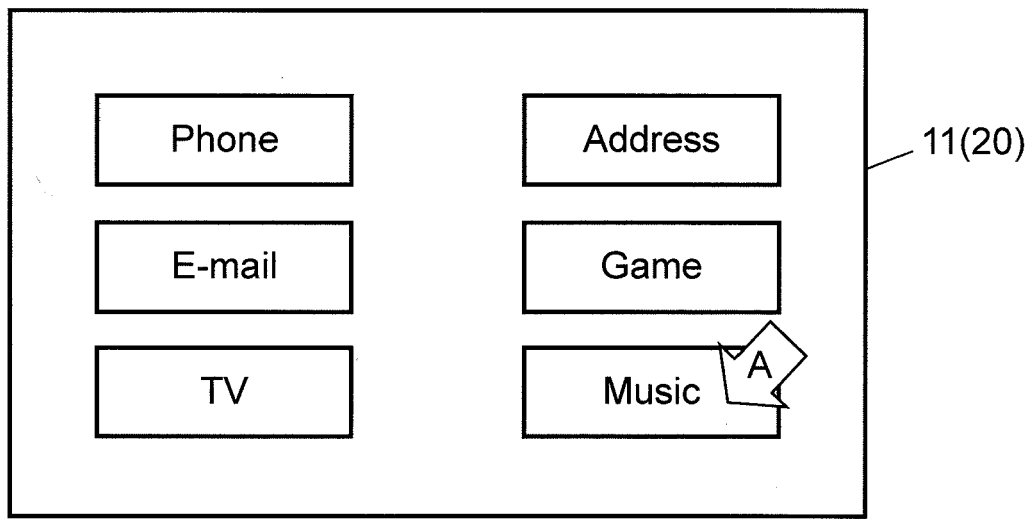
FIGS. 5A and 5B are plan views showing a state in which the touch panel shown in FIG. 1 is mounted on a display device.

As shown in a plan view of FIG. 5A, in a state in which a plurality of menus are displayed on a display device at the back of touch panel 20, a user presses the top surface of upper substrate 11 on a desired menu. When the user presses a place shown by, for example, arrow A, electronic circuit 30 detects the position in the front-rear direction based on the voltage detected from belt-shaped conductive layer 12A, and detects the position in the right-left direction based on which number belt-shaped conductive layer 12A is. According to this detection, electronic circuit 30 selects a desired menu from the plurality of menus.

Figure 5B:
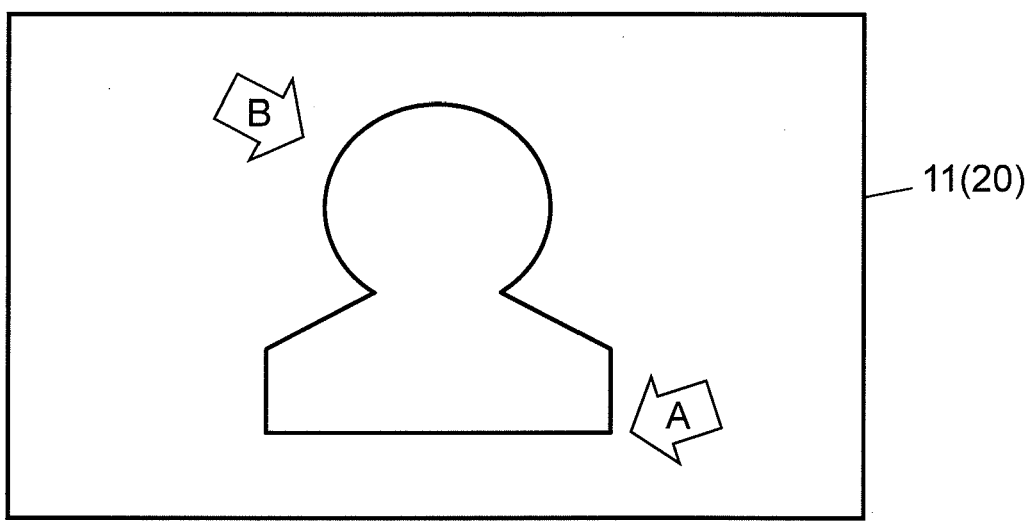

Furthermore, as shown in FIG. 5B, in a state in which, for example, a photograph, a map, or the like, is displayed on the display device at the back of touch panel 20, a user presses, for example, a place shown by arrow A on the lower right part. Also in this case, similar to the above-mentioned case, electronic circuit 30 detects the pressed position shown by arrow A. At this time, when the user presses the place shown by arrow B on the upper left part by another finger simultaneously while pressing the place shown by arrow A, the position shown by arrow B also bends downward. For example, as shown in FIGS. 1, 2, and 4, belt-shaped conductive layer 12B corresponding to the thus pressed place is also brought into contact with lower conductive layer 14.

In this case, for example, a voltage of 4V is detected from belt-shaped conductive layer 12B. Therefore, based on this detected voltage, electronic circuit 30 detects the position of arrow B in the front-rear direction. Furthermore, from the fact that belt-shaped conductive layer 12B from which the voltage is detected is, for example, the second from the left in upper conductive layer 12, electronic circuit 30 detects the position in the right-left direction. Thus, in touch panel 20, even when a plurality of positions are pressed, in a case belt-shaped conductive layers that are brought into contact with lower conductive layer 14 are different, each of the pressed positions can be detected.

Furthermore, in this way, while a user presses the lower right place and upper left place of a photograph, map, or the like, the user moves two fingers outward or inward on the diagonal line. In this case, similar to the above-mentioned case, electronic circuit 30 detects the movement of the two pressed positions shown by arrows A and B. Based on this detection, electronic circuit 30 zooms in and out the display of, for example, a photograph or a map on the display device. Such various operations can be carried out.

That is to say, when two places shown by arrows A and B are pressed simultaneously in a state in which, for example, 5 V of voltage is applied to both ends of lower conductive layer 14, for example, 1V of voltage is detected from belt-shaped conductive layer 12A and for example, 4V of voltage is detected from belt-shaped conductive layer 12B. In this way, since detected voltage differs depending upon the difference in the pressed positions in the front-rear direction, electronic circuit 30 can detect a plurality of pressed positions.

As mentioned above, upper conductive layer 12 provided on the bottom surface of upper substrate 11 is formed of a plurality of belt-shaped conductive layers, and belt-shaped conductive layer 12A, 12B, or the like is brought into contact with rectangular-shaped lower conductive layer 14 by a press operation. Then, based on the voltage of belt-shaped conductive layer 12A, 12B, or the like, the position in the front-rear direction is detected. On the other hand, the position in the right-left direction is detected based on which number belt-shaped conductive layer 12A or 12B is. Thus, a plurality of pressed positions can be detected.

Furthermore, the number of wirings 151, 161A, and 161B to be connected to electronic circuit 30 can be reduced. The number of wirings 151 at the upper substrate 11 side is several tens, which is the same as that of the belt-shaped conductive layers, and the number of wirings 161A and 161B at the lower substrate 13 side is only two. Therefore, it is possible to prevent the entire outer shape from being increased and to simplify connection to electronic circuit 30 and arithmetic processing for detection of positions. Various operations can be carried out with such a simple configuration.

Figure 6A:
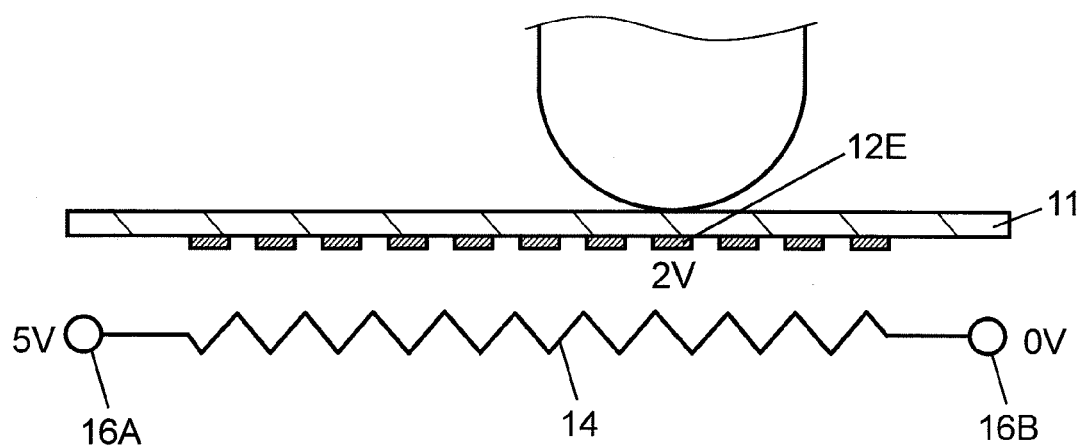
FIGS. 6A and 6B are conceptual views showing a cross section when the touch panel shown in FIG. 4 is pressed for operation.

Furthermore, the following detection can be also carried out by using touch panel 20. Firstly, as shown in the conceptual sectional view shown in FIG. 6A, a user presses the top surface of upper substrate 11 by slightly touching the top surface by a finger. In this case, upper substrate 11 bends downward, causing only belt-shaped conductive layer 12E in the pressed place to be brought into contact with lower conductive layer 14. In a state in which, for example, 5V of voltage is applied to between lower electrode 16A and lower electrode 16B, for example, 2 V of voltage is detected from belt-shaped conductive layer 12E.

Figure 6B:
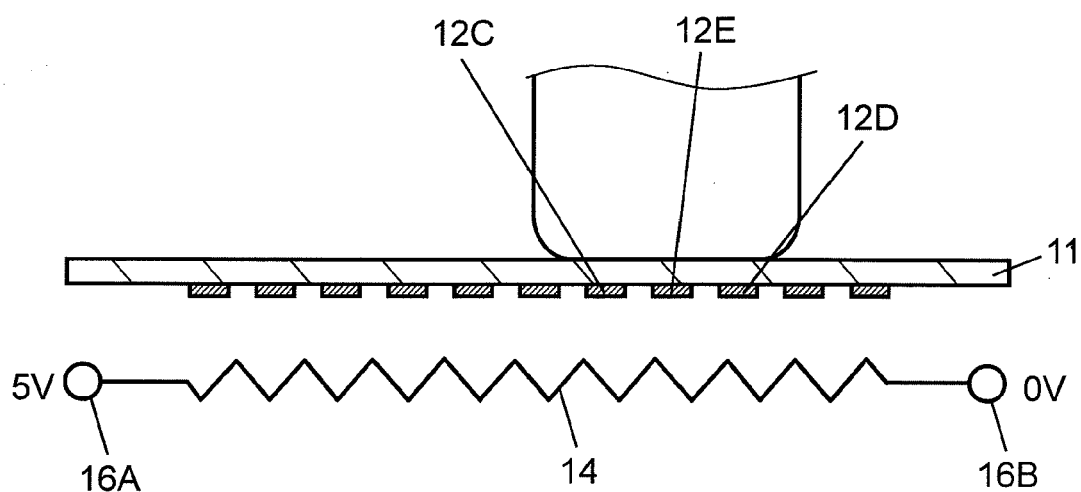

When the user further presses the top surface of the upper substrate 11 strongly by a finger with force added, the contact area of the finger is increased and upper substrate 11 bends larger as shown in FIG. 6B. Therefore, a part that is brought into contact with lower conductive layer 14 of belt-shaped conductive layer 12E is expanded in the front-rear direction, thus causing belt-shaped conductive layers 12C and 12D to be brought into contact with lower conductive layer 14. As a result, a voltage is detected also from belt-shaped conductive layers 12C and 12D.

That is to say, since upper conductive layer 12 on the bottom surface of upper substrate 11 is formed of a plurality of belt-shaped conductive layers, the number of belt-shaped conductive layers that are brought into contact with lower conductive layer 14 differ according to whether the case in which the top surface of upper substrate 11 is operated by slightly touching the top surface by a finger or the case in which the surface is operated to be pressed strongly.

Therefore, for example, as shown in FIG. 5A, when touch panel 20 is slightly touched in a state in which a plurality of menus or the like are displayed on the display device, the next menu is displayed, for example. When touch panel 20 is strongly touched, the selected menu is determined. Such various operations can be carried out.

In the above description, a configuration in which upper conductive layer 12 on the bottom surface of upper substrate 11 is formed of a plurality of belt-shaped conductive layers is described. Besides, as shown in an exploded perspective view of FIG. 7, upper conductive layer 22 may be formed in a rectangular shape, and lower conductive layer 24 on the top surface of lower substrate 13 may be formed of a plurality of belt-shaped conductive layers. In this case, one of lower electrodes 26 is provided on each end portion of a plurality of belt-shaped conductive layers, and upper conductive layer 22 is formed of a single conductive layer facing all of the belt-shaped conductive layers. Then, upper conductive layer 22 is provided with a pair of upper electrodes 25A and 25B in positions which correspond to both ends in the direction in which the belt-shaped conductive layers extend. Also in such a configuration, the same effect can be obtained as that of touch panel 20 shown in FIGS. 1 and 2.

That is to say, electronic circuit 30 applies a voltage between upper electrodes 25A and 25B, and then detects a voltage on each of lower electrodes 26. Furthermore, electronic circuit 30 detects a pressed position on upper substrate 11 in the direction in which the belt-shaped conductive layers are arranged, based on the position on the belt-shaped conductive layer connected to the lower electrode from which the voltage is detected among lower electrodes 26. On the other hand, electronic circuit 30 detects a pressed position on upper substrate 11 in the direction in which the belt-shaped conductive layer extends, based on the voltage value detected from the lower electrode from which the voltage is detected among lower electrodes 26.

Thus, in this embodiment, upper conductive layer 12 on the bottom surface of upper substrate 11 is formed of a plurality of belt-shaped conductive layers, and lower conductive layer 14 as a counterpart to upper conductive layer 12 is formed of a single conductive layer facing all of the plurality of belt-shaped conductive layers. Alternatively, lower conductive layer 24 on the top surface of lower substrate 13 is formed of a plurality of belt-shaped conductive layers and upper conductive layer 22 as a counterpart to lower conductive layer 24 is formed of a single conductive layer facing all of the plurality of belt-shaped conductive layers. With either one of the configurations, only by detecting a voltage from any one of upper conductive layer 12 and lower conductive layer 24 formed of a plurality of belt-shaped conductive layers, a plurality of the pressed positions can be detected. Therefore, the number of upper electrodes 15, lower electrodes 16A and 16B, or upper electrodes 25A and 25B and lower electrodes 26 can be reduced. It is possible to prevent the entire outer shape from being increased. Furthermore, it is possible to simplify connection to electronic circuit 30 and arithmetic processing for detection of positions. It is possible to manufacture a touch panel capable of detecting a plurality of pressed positions and capable of carrying out various operations with a simple configuration.

Figure 8:
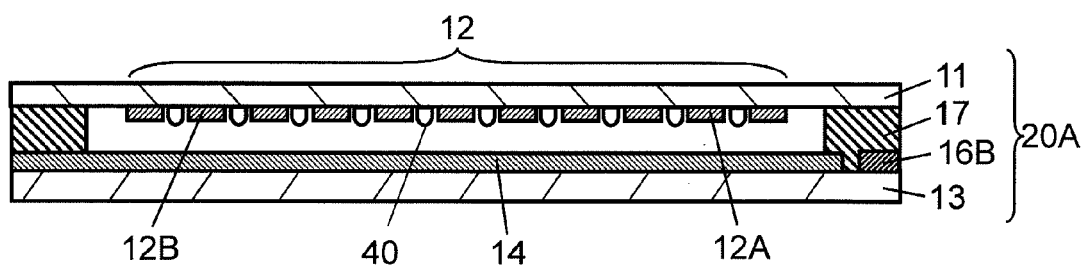
FIG. 8 is a sectional view of still another touch panel in accordance with the first embodiment of the present invention.
Figure 9:
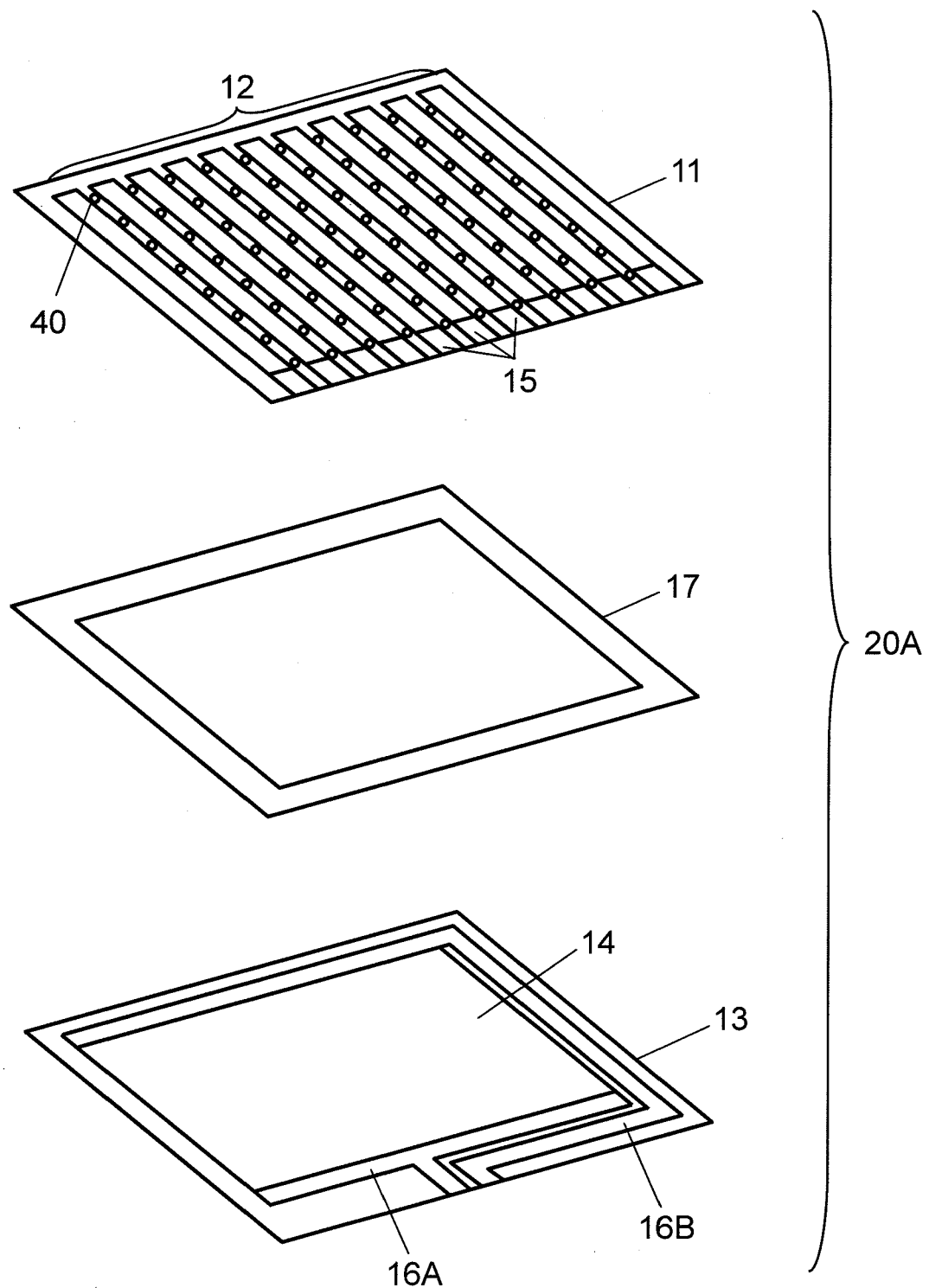
FIG. 9 is an exploded perspective view of the touch panel shown in FIG. 8.
Figure 10:
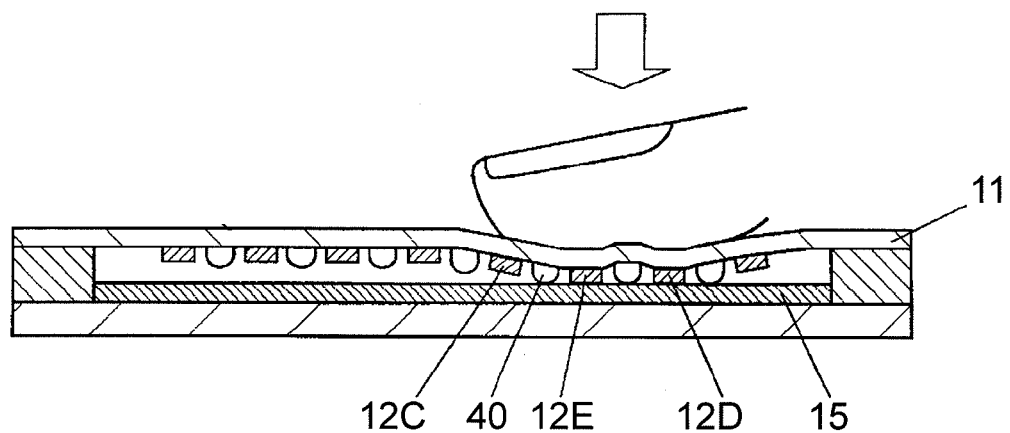
FIG. 10 is a conceptual view showing a cross section when the touch panel shown in FIG. 8 is pressed for operation.

Next, a preferable structure in this embodiment is described with reference to FIGS. 8 to 10. FIG. 8 is a sectional view of still another touch panel in accordance with the present embodiment. FIG. 9 is an exploded perspective view of the touch panel shown in FIG. 8. FIG. 10 is a conceptual view showing a cross section when the touch panel shown in FIG. 8 is pressed for operation. As same as FIG. 2, FIG. 9 shows a transparent view of an upper substrate.

Touch panel 20A has dot spacers 40 arranged in lines between belt-shaped conductive layers forming upper conductive layer 12. Each dot spacer 40 projects downward further than upper conductive layer 12. As shown in FIG. 10, belt-shaped conductive layer 12C is pressed by a tip of a finger or the like. Therefore, the pressing force applied to belt-shaped conductive layer 12C is weak, unlike belt-shaped conductive layer 12D or 12E which is pressed by a center part of the finger. Dot spacer 40 prevents belt-shaped conductive layer 12C from touching lower conductive layer 14 unsteadily. Thanks to such a simple structure, the pressed position can be detected reliably. Therefore, a complicated processing in an electronic circuit for preventing a false detection of a pressed position is unnecessary.

In the case that dot spacers 40 arranged in lines between belt-shaped conductive layers forming upper conductive layer 12 are provided, it is not necessary to form dot spacers (not shown) on lower conductive layer 14. Alternatively, in the case that both of the dot spacers (not shown) on lower conductive layer 14 and dot spacers 40 are formed, it is necessary to arrange them so that they don't disturb touch of upper conductive layer 12 and lower conductive layer 14 when the touch panel is operated by, for example, collision of the both dot spacers.

Meanwhile, it is preferable to form dot spacers projecting upward further than lower conductive layer 24 arranged in lines between belt-shaped conductive layers forming lower conductive layer 24 in the touch panel shown in FIG. 7. Such a structure has same effect as that of FIGS. 8 and 9.

As mentioned above, by using a touch panel with a simple configuration according to the present embodiment, a plurality of pressed positions can be detected, and various operations can be carried out. This touch panel is useful mainly for operating various electronic equipments.

Second Exemplary Embodiment

Figure 11:
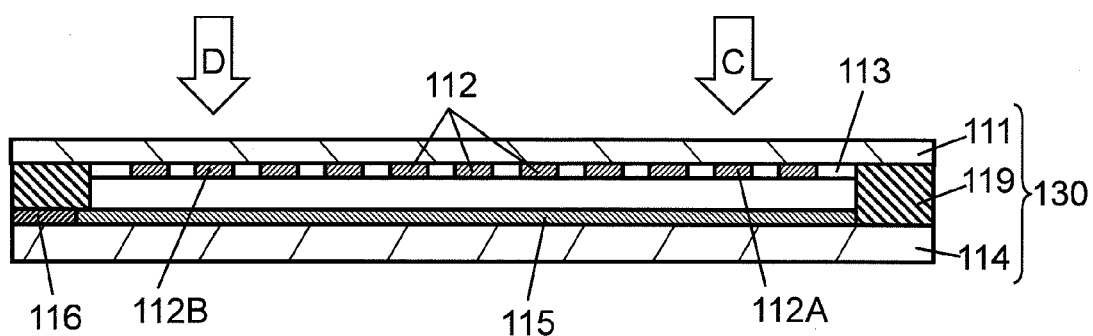
FIG. 11 is a sectional view showing a touch panel in accordance with a second embodiment of the present invention.
Figure 12:
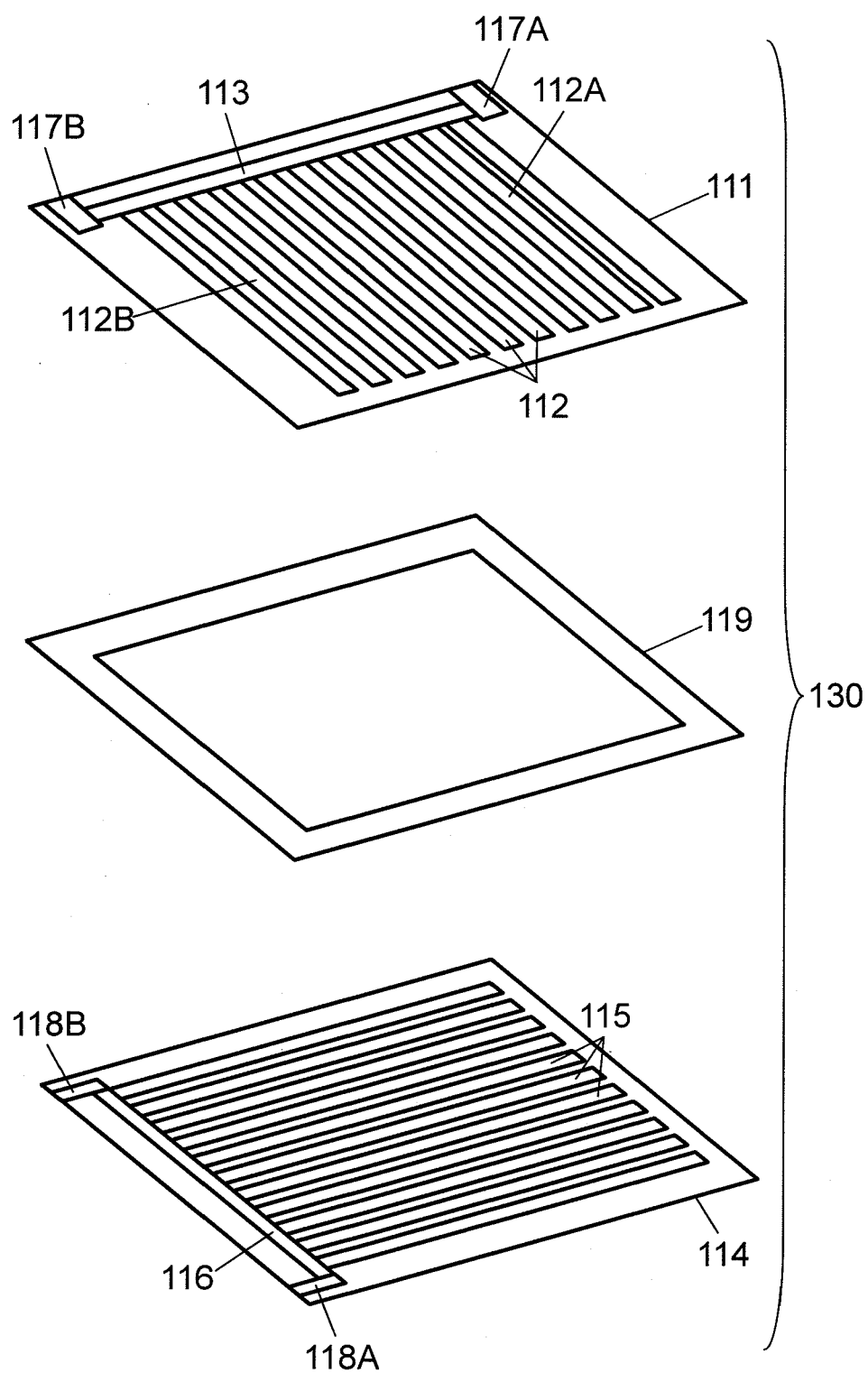
FIG. 12 is an exploded perspective view showing the touch panel shown in FIG. 11.

FIGS. 11 and 12 are a sectional view and an exploded perspective view showing a touch panel in accordance with a second embodiment of the present invention. FIG. 13 is a diagram showing a connection between the touch panel and an electronic circuit. Touch panel 130 includes upper substrate 111, a plurality of belt-shaped upper conductive layers 112, upper resistive layer 113, first upper electrode 117A, second upper electrode 117B, lower substrate 114, a plurality of belt-shaped lower conductive layers 115, lower resistive layer 116, first lower electrode 118A, second lower electrode 118B, and spacer 119.

Light-transparent upper substrate 111 is made of polyethylene terephthalate, polyether sulphone, or polycarbonate. Belt-shaped upper conductive layers 112 are formed on the bottom surface of upper substrate 111. Upper conductive layers 112 are made of indium tin oxide, oxide tin, or the like, and formed in the front-rear direction by sputtering or the like. Upper resistive layer 113 made of carbon or the like is connected to the rear end portion of each upper conductive layer 112. That is to say, upper resistive layer 113 connects upper conductive layers 112 at end portions of upper conductive layers 112. Upper electrodes 117A and 117B are made of silver, carbon, or the like, and formed on both ends of upper resistive layer 113. FIG. 12 shows a transparent view of upper substrate 111.

Light-transparent lower substrate 114 is made of glass, acrylic, polycarbonate, or the like. Belt-shaped lower conductive layers 115 are formed on the top surface of lower substrate 114. Belt-shaped lower conductive layers 115 are made of indium tin oxide, tin oxide, or the like, and formed in the right-left direction by sputtering or the like. Thus, lower conductive layers 115 face upper conductive layers 112 with a predetermined gap therebetween and extend in the direction perpendicular to the direction in which upper conductive layers 112 extend. Lower resistive layer 116 made of, for example, carbon is connected to the left end portions of lower conductive layers 115. That is to say, lower resistive layer 16 connects lower conductive layers 115 at the end portions of lower conductive layers 115. Dot spacers (not shown) made of insulating resin such as epoxy resin and silicone resin are formed on the top surface of lower substrate 114 with a predetermined interval. Lower electrodes 118A and 118B are made of silver, carbon, or the like, and formed on both ends of lower resistive layer 116.

Frame-shaped spacer 119 is made of polyester, epoxy resin, non-woven fabric, or the like, and formed on the inner edge of the outer periphery between upper substrate 111 and lower substrate 114. That is to say, spacer 119 is interposed between upper substrate 111 and lower substrate 114. An adhesive agent (not shown) such as acrylic agent or rubber agent is coated on either or both of the top and bottom surfaces of spacer 119. With this adhesive agent, upper substrate 111 and lower substrate 114 are attached to each other at their outer peripheries such that upper conductive layer 112 faces lower conductive layer 115 with a predetermined gap therebetween.

The thus formed touch panel 130 is disposed on the front surface of, for example, a liquid crystal display device and is mounted on electronic equipment. Then, as shown in FIG. 13, upper electrodes 117A and 117B, and lower electrodes 118A and 118B are electrically connected to electronic circuit 150 of the electronic equipment.

Figure 14A:
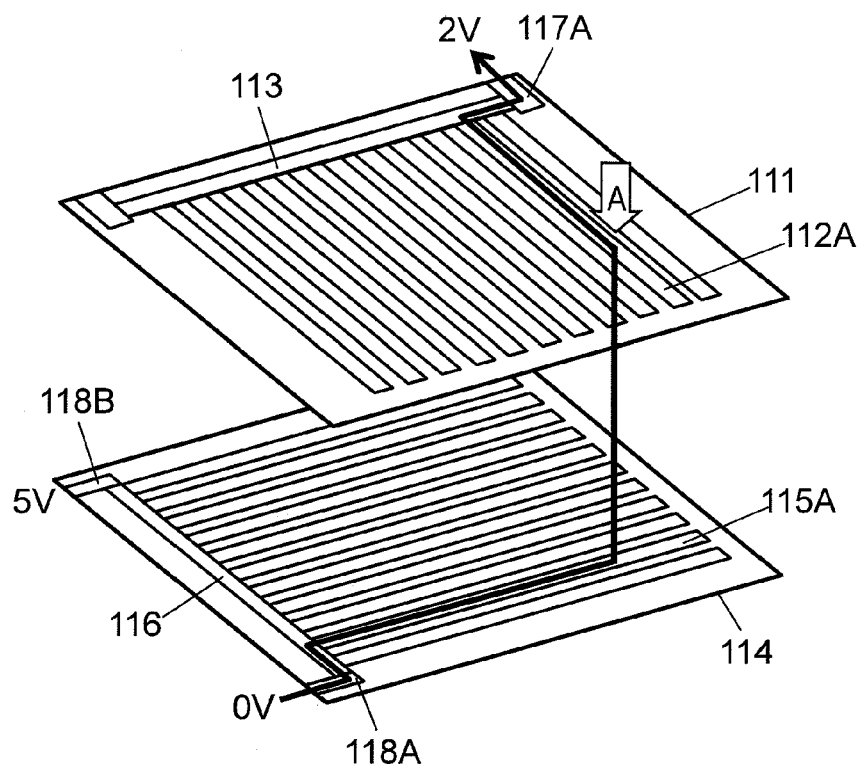
FIGS. 14A and 14B are views for illustrating a principle of detection of a pressed position on the touch panel shown in FIG. 12.

Next, a principle of detection of a pressed operation position and pressed operation positions on touch panel 130 is described with reference to FIGS. 14A to 17B. FIGS. 14A, 14B, 16A to 17B are views for illustrating a principle of detection of a pressed position or pressed operation positions on the touch panel shown in FIG. 12. FIGS. 15A and 15B are plan views showing a state in which the touch panel shown in FIG. 11 is mounted on a display device.

A user operates by pressing a place on the top surface of upper substrate 111, for example, a place shown by arrow C, by a finger, a pen, or the like, in response to the indication on the display device disposed at the back of touch panel 130. In this case, upper substrate 111 bends downward, and one of upper conductive layers 112 at the pressed place is brought into contact with any of lower conductive layers 115 on the top surface of lower substrate 114. For example, as shown in FIG. 14A, upper conductive layer 112A is brought into contact with lower conductive layer 115A.

Electronic circuit 150 applies a voltage between lower electrodes 118A and 118B. For example, electric circuit 150 applies a voltage of 5 V between lower electrodes 118A and 118B. In this state, a voltage corresponding to voltage drop generated in the portion from lower electrode 118A to lower conductive layer 115A in lower resistive layer 116 is detected at upper electrode 117A. For example, a voltage of 2 V is detected from upper electrode 117A. Based on the voltage, electric circuit 150 detects a press operation position of arrow C in the front-rear direction.

Figure 14B:
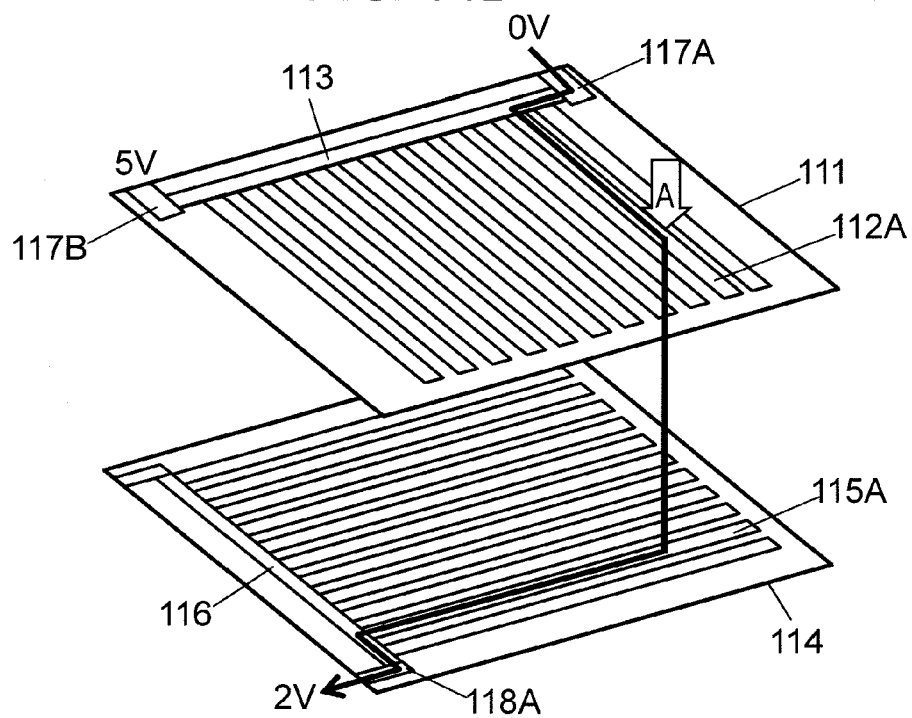
Figure 15A:
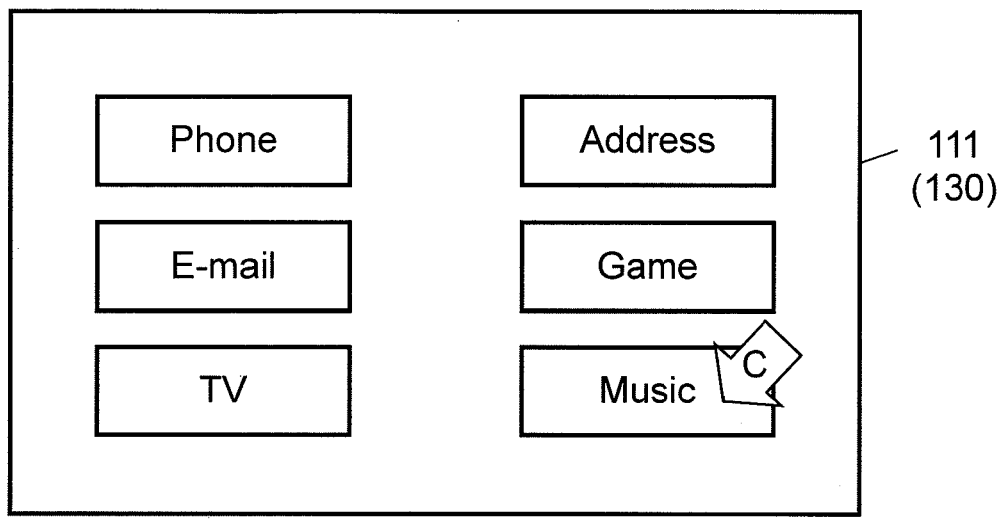
FIGS. 15A and 15B are plan views showing a state in which the touch panel shown in FIG. 11 is mounted on a display device.
Figure 15B:
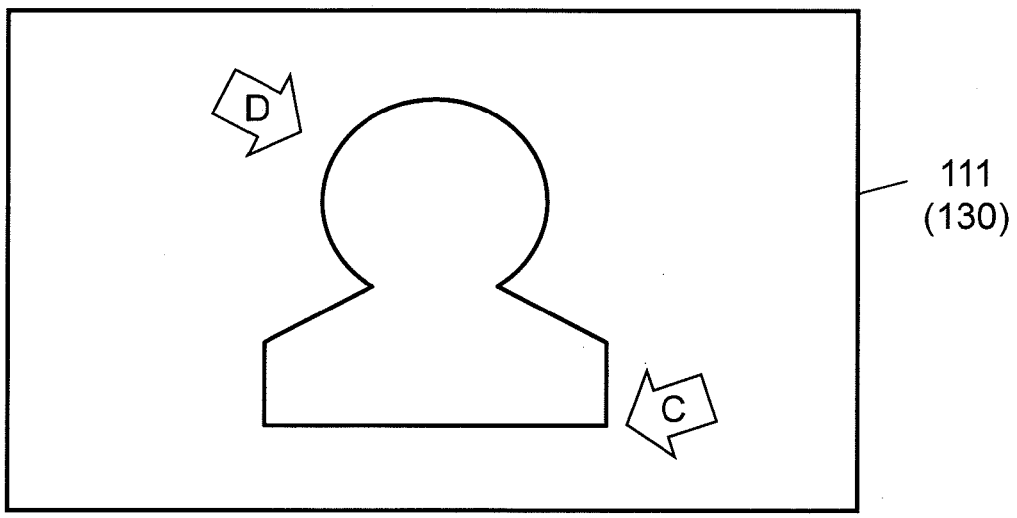

As shown in FIG. 14B, electronic circuit 150 then switches electrodes to which a voltage is to be applied, and applies a voltage between upper electrodes 117A and 117B. Also in this case, electric circuit 150 applies a voltage of 5 V between upper electrode 117A and upper electrode 117B. In this state, a voltage corresponding to voltage drop generated in the portion from upper electrode 117A to upper conductive layer 112A in upper resistive layer 113 is detected at upper electrode 118A. For example, a voltage of 2 V is detected from lower electrode 118A. Based on the voltage, electric circuit 150 detects a press operation position of arrow C in the right-left direction.

That is to say, as shown in FIG. 15A, in a state in which a plurality of menus are displayed on a display device at the back of touch panel 130, a user presses the top surface of upper substrate 111 on a desired menu. For example, when the user presses a place shown by arrow C, electronic circuit 150 applies a voltage to lower electrodes 118A and 118B and upper electrodes 117A and 117B sequentially. Then, electronic circuit 150 detects a pressed position in the front-rear direction based on the voltage detected at upper electrode 117A and then detects a pressed position in the right-left direction based on the voltage detected at lower electrode 118A. According to these detections, electronic circuit 150 selects a desired menu from the plurality of menus.

Furthermore, as shown in FIG. 15B, in a state in which, for example, a photograph or a map is displayed on a display device at the back of touch panel 130, a user presses, for example, a place shown by arrow C in the lower right part. Also in this case, similar to the above-mentioned case, electronic circuit 150 detects the pressed position shown by arrow C. At this time, when the user presses a place shown by arrow D in the upper left part by another finger simultaneously while pressing the place shown by arrow C, the position shown by arrow D of upper substrate 111 also bends downward.

Figure 16A:
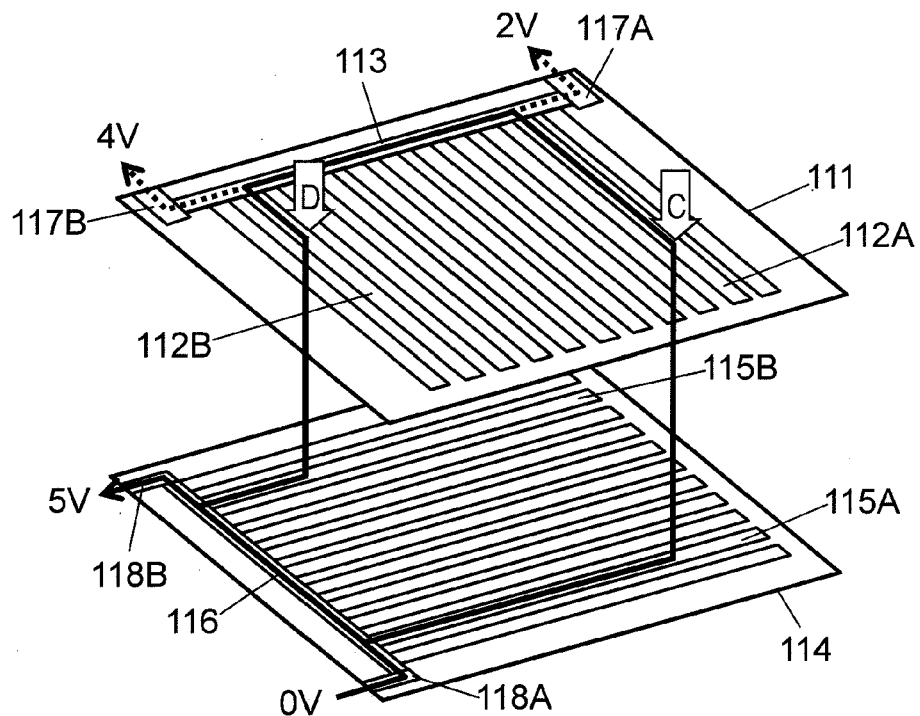
FIGS. 16A, 16B, 17A, and 17B are views for illustrating a principle of detection of pressed positions on the touch panel shown in FIG. 12.

In this case, for example, as shown in FIG. 16A, upper conductive layer 112A is brought into contact with lower conductive layer 115A in a place shown by arrow C in the lower right part, and upper conductive layer 112B is brought into contact with lower conductive layer 115B in a place shown by arrow D in the upper left part.

At this time, electronic circuit 150 applies a voltage between lower electrodes 118A and 118B. For example, electric circuit 150 applies a voltage of 5 V to between lower electrodes 118A and 118B. In this case, for example, a voltage of 2 V is detected from upper electrode 117A. Based on the voltage value, electric circuit 150 detects a pressed position of arrow C in the front-rear direction. At the same time, a voltage of, for example, 4V is detected from upper electrode 117B. Therefore, based on the voltage value, electronic circuit 150 detects the pressed position of arrow D in the front-rear direction. That is to say, electronic circuit 150 detects the pressed position of arrow C in the direction in which lower conductive layers 115 are arranged based on the voltage value detected from upper electrode 117A, and detects the pressed position of arrow D in the direction in which lower conductive layers 115 are arranged based on the voltage value detected from upper electrode 117B.

Figure 16B:
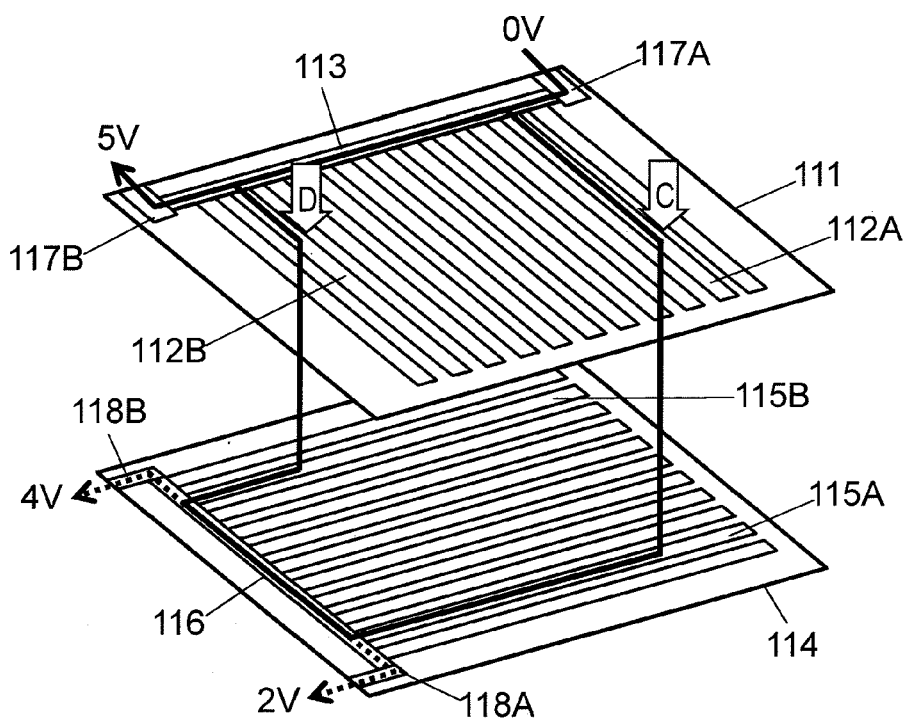

Furthermore, electronic circuit 150 then switches electrodes to which a voltage is to be applied, and applies a voltage of, for example, 5 V between upper electrode 117A and upper electrode 117B as shown in FIG. 16B. In this case, for example, a voltage of 2 V is detected from lower electrode 118A, and a voltage of 4 V is detected from lower electrode 118B. Therefore, based on the voltages, electronic circuit 150 detects pressed positions of arrows C and D in the right-left direction. That is to say, electronic circuit 150 detects a pressed position of arrow C in the direction in which upper conductive layers 112 are arranged based on the voltage value detected from lower electrode 118A, and detects a pressed position of arrow D in the direction in which upper conductive layers 112 are arranged based on the voltage value detected from lower electrode 118B.

As described above, electronic circuit 150 applies a voltage lower electrodes 118A and 118B and upper electrodes 117A and 117B, sequentially. Then, electronic circuit 150 detects the pressed positions of arrows C and D in the front-rear direction based on voltages of upper electrode 117A and upper electrode 117B, respectively, and detects the pressed positions in the right-left direction based on a voltage detected from lower electrodes 118A and 118B, respectively. Thus, electronic circuit 150 detects two pressed positions.

Furthermore, as shown in FIG. 15B, the user moves two fingers outward or inward on the diagonal line while pressing places in the lower right part and in the upper left part of a photograph, map, or the like. In this case, similar to the above-mentioned case, electronic circuit 150 detects the movement of the two pressed positions shown by arrows C and D. Based on these detections, electronic circuit 150 zooms in and out the display of, for example, a photograph or a map on the display device. Such various operations are carried out.

In this way, upper conductive layers 112 and lower conductive layers 115 are formed in a belt shape such that they extend in directions perpendicular to each other. Then, the end portions of upper conductive layers 112 and the end portions of lower conductive layers 115 are connected by upper resistive layer 113 and lower resistive layer 116, respectively. According to this configuration, only by detecting voltages at four electrodes, that is, upper electrodes 117A and 117B and lower electrodes 118A and 118B which are provided on both ends of upper resistive layer 113 and lower resistive layer 116, two pressed positions can be detected.

Therefore, the connection between electronic circuit 150 and touch panel 130 and arithmetic processing for detection of positions in electronic circuit 150 are also simplified. Furthermore, as mentioned above, by detecting the change of a plurality of the pressed positions, it is possible to carry out various operations including not only a simple selection of menu, or the like, but also zooming in and out of a screen displayed on a display device.

Note here that when two places are pressed, a resistance value of each part of upper resistive layer 113, a resistance value of each part of lower resistive layer 116, and a voltage from each electrode have the following relation. For example, in FIG. 16A, a resistance value of resistive layer 116 between lower electrode 118A and lower conductive layer 115A is defined as $R_{LA}$. A resistance value of resistive layer 116 between lower conductive layer 115B and lower electrode 118B is defined as $R_{LB}$. A resistance value of resistive layer 116 between lower conductive layers 115A and 115B is defined as $R_{LAB}$. A resistance value of upper resistive layer 113 between upper conductive layers 112A and 112B is defined as $R_{UAB}$. In those definitions, a voltage output from upper electrode 117A is a value obtained by multiplying a voltage applied between lower electrodes 118A and 118B by $R_{LA}/\{R_{LA}+R_{LB}+1/(1/R_{LAB}+1/R_{UAB})\}$. This is because two places are pressed, so that resistance value $R_{UAB}$ of upper resistive layer 113 between upper conductive layers 112A and 112B is connected in parallel to resistance value $R_{LAB}$ of lower resistive layer 116 between upper conductive layers 112A and 112B. Furthermore, a voltage output from upper electrode 117B is a value obtained by multiplying a voltage applied between lower electrodes 118A and 118B by $\{R_{LA}+1/(1/R_{LAB}+1/R_{UAB})\}/\{R_{LA}+R_{LB}+1/(1/R_{LAB}+1/R_{UAB})\}$.

Similarly, as shown in FIG. 16B, a resistance value of upper resistive layer 113 between upper electrode 117A and upper conductive layer 112A is defined as $R_{UA}$. A resistance value of upper resistive layer 113 between upper conductive layer 112B and upper electrode 117B is defined as $R_{UB}$. In those definitions, a voltage output from lower electrode 118A is a value obtained by multiplying a voltage applied between upper electrodes 117A and 117B by $R_{UA}/\{R_{UA}+R_{UB}+1/(1/R_{LAB}+1/R_{UAB})\}$. Furthermore, a voltage output from lower electrode 118B is a value obtained by multiplying a voltage applied between upper electrodes 117A and 117B by $\{R_{UA}+1/(1/R_{LAB}+1/R_{UAB})\}/\{R_{UA}+R_{UB}+1/(1/R_{LAB}+1/R_{UAB})\}$.

In this way, according to the voltages respectively applied to between upper electrodes 117A and 117B and between lower electrodes 118A and 118B, the number of belt-shaped upper conductive layers 112 and lower conductive layers 115, and the pressed positions, voltages are output to upper electrodes 117A and 117B and lower electrodes 118A and 118B. In this case, it is enough that upper resistive layer 113 and lower resistive layer 116 are formed in such a way in which the length is proportional to the resistance value. That is to say, a complicated configuration in which specific resistance of the resistive layers is changed according to the number of conductive layers is not needed. A plurality of pressed positions can be detected with such a simple configuration.

Figure 17A:
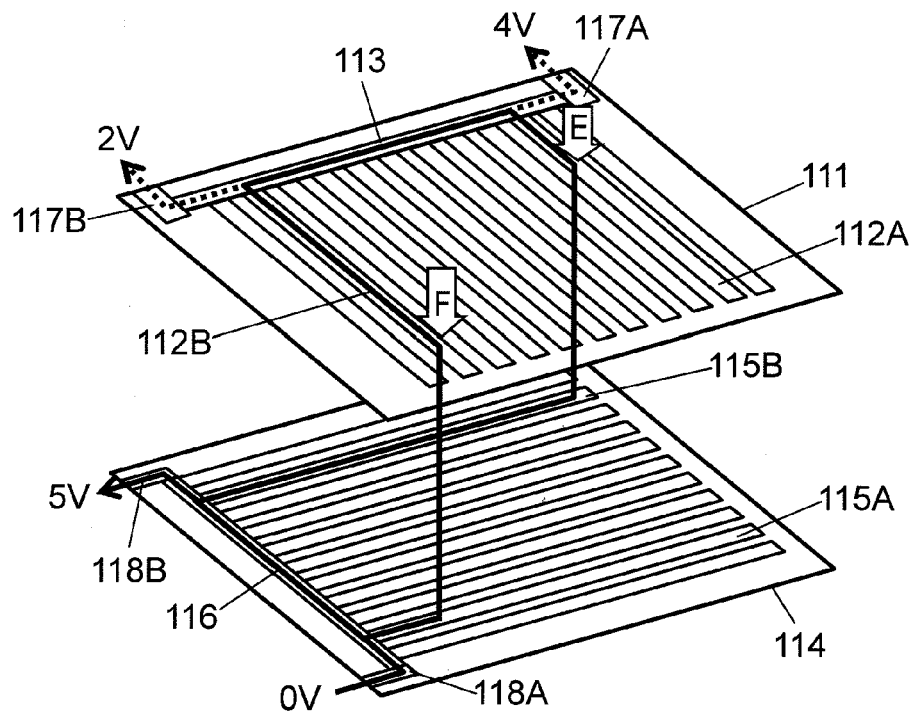

On the contrary to the above-mentioned case, as shown in FIG. 17A, for example, a user may presses places shown by arrow E in the upper right part and shown by arrow F in the lower left part simultaneously. In this case, in the place shown by arrow E, upper conductive layer 112A is brought into contact with lower conductive layer 115B, and in the place shown by arrow F, upper conductive layer 112B is brought into contact with lower conductive layer 115A.

Then, electronic circuit 150 applies a voltage of 5 V between lower electrodes 118A and 118B. In this case, a voltage of, for example, 4V is detected from upper electrode 117A, and a voltage of, for example, 2V is detected from upper electrode 117B. Based on these voltage values, electronic circuit 150 detects pressed positions of arrow E and arrow F in the front-rear direction.

Figure 17B:
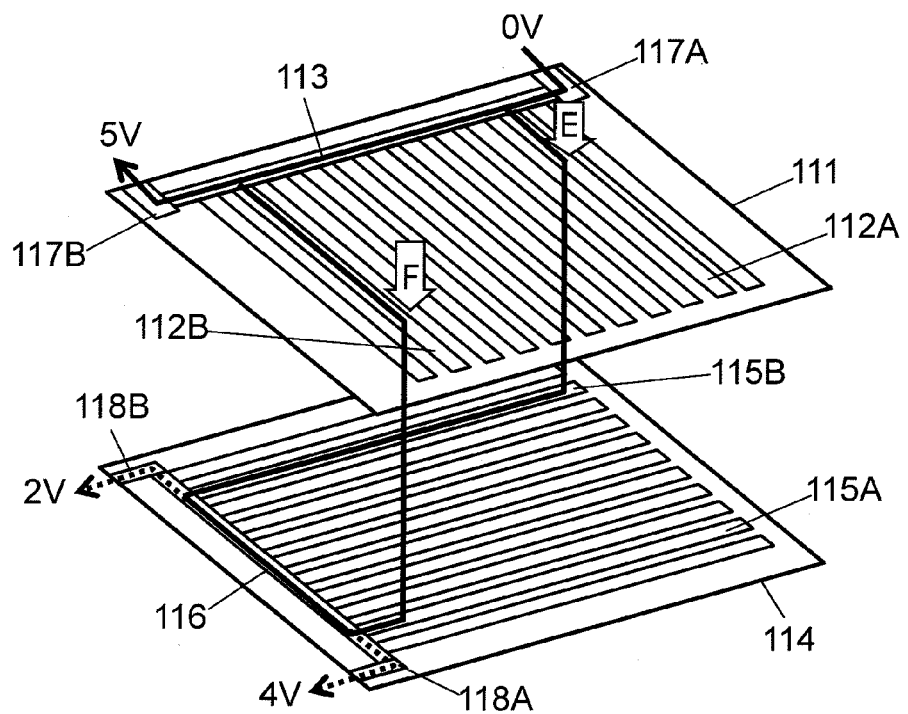

Furthermore, as shown in FIG. 17B, electronic circuit 150 applies a voltage of 5 V between upper electrodes 117A and 117B. In this case, for example, a voltage of 4V is detected from lower electrode 118A, and a voltage of 2V is detected from lower electrode 118B. Based on the voltage values, electronic circuit 150 detects pressed positions of arrows E and F in the right-left direction.

That is to say, when places shown by arrows E and F located symmetric to arrows C and D are pressed, voltage values contrary to those in the case of arrows C and D mentioned above are detected from each electrode. Electronic circuit 150 can detect pressed positions correctly when such a pressing operation is carried out.

Thus, in touch panel 130, upper conductive layers 112 on the bottom surface of upper substrate 111 and lower conductive layers 115 on the top surface of lower substrate 114 are formed in a belt shape such that they extend in directions perpendicular to each other. Then, the end portions of upper conductive layers 112 and the end portions of lower conductive layers 115 are connected by upper resistive layer 113 and lower resistive layer 116, respectively. According to this configuration, by applying a voltage to both ends of upper resistive layer 113 and lower resistive layer 116 sequentially and detecting voltages at both ends of lower resistive layer 116 and upper resistive layer 113, two pressed positions can be detected. Moreover, the number of electrodes 117A, 117B, 118A, and 118B can be as small as four. Therefore, the connection to electronic circuit 150 and arithmetic processing for detection of positions are also simplified. Touch panel 130 can operate various operations with such a simple configuration.

Note that upper conductive layers 112 do not have to extend perpendicular to the extending direction of lower conductive layers 115. The angle of the extending directions may be shifted from the right angle. That is to say, the extending direction of upper conductive layers 112 may not be parallel with that of lower conductive layers 115, and it is enough that the extending direction of upper conductive layers 112 intersects that of lower conductive layers 115.

Figure 18:
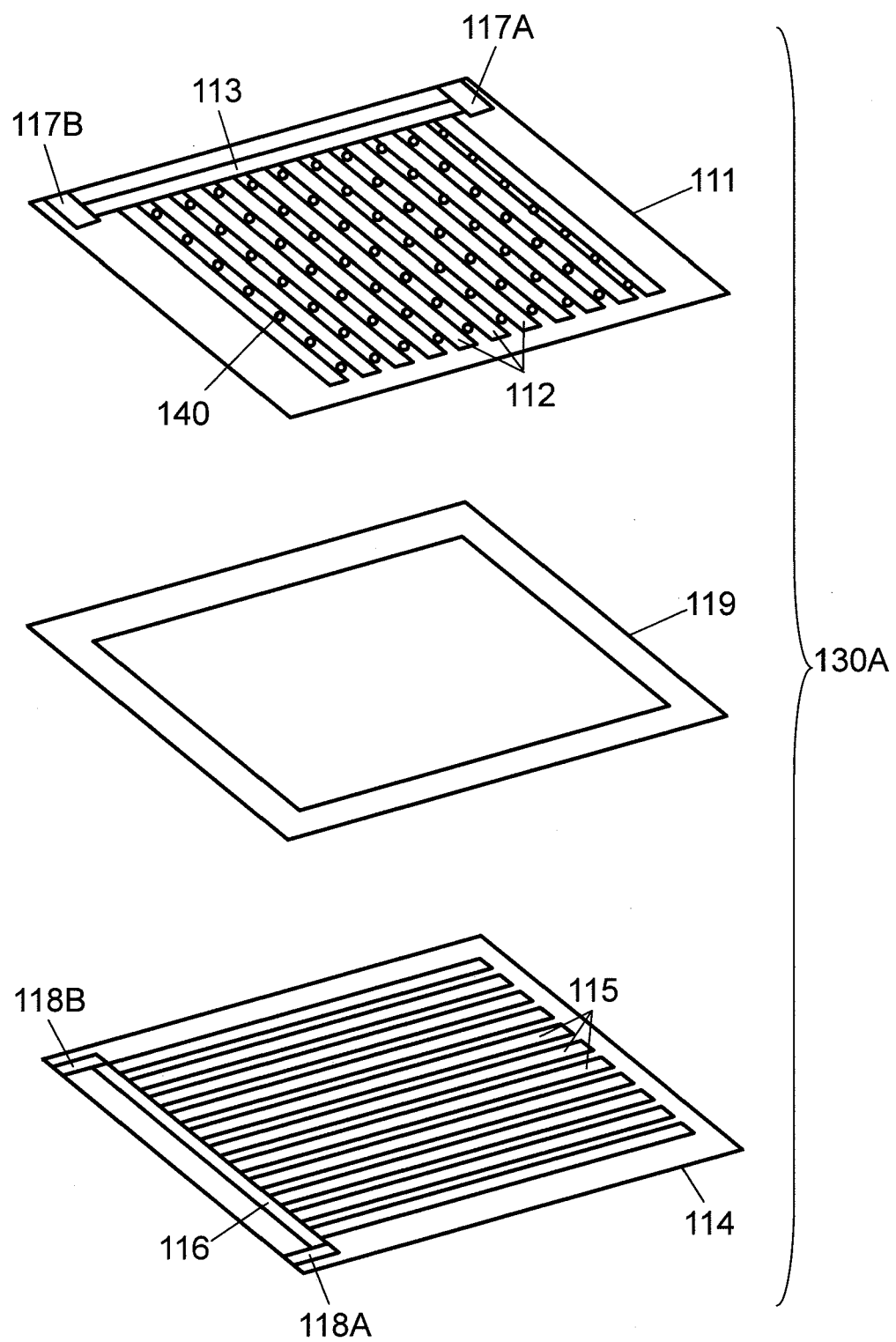
FIG. 18 is an exploded perspective view showing another touch panel in accordance with the second embodiment of the present invention.
Figure 19:
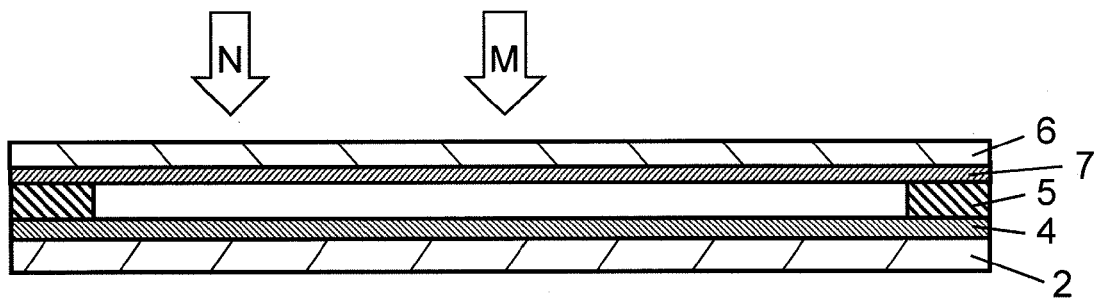
FIG. 19 is a sectional view of a conventional touch panel.

Next, a preferable structure in this embodiment is described with reference to FIG. 18. FIG. 18 is an exploded perspective view showing another touch panel in accordance with the present embodiment. As same as FIG. 12, FIG. 18 shows a transparent view of an upper substrate.

Touch panel 130A has dot spacers 140 arranged in lines between belt-shaped upper conductive layers 112. Each dot spacer 140 projects downward further than upper conductive layer 112. Dot spacer 140 prevents an upper conductive layer weakly pressed by a tip of a finger or the like, not by a center part of the finger from unsteadily touching one of lower conductive layers 115 which is located corresponding to the weakly pressed upper conductive layer. Thanks to such a simple structure, the pressed position can be detected reliably. Namely, dot spacers 140 serve as same as dot spacers 40 shown in FIGS. 8 to 10 in the first exemplary embodiment.

In the present embodiment, if upper conductive layers 112 and lower conductive layers 115 are in contact with each other at two positions by a pressing at a single position, the resistance of the conductive route changes significantly. Accordingly, a remarkable false detection occurs in this case. Therefore, forming dot spacer 140 is particularly effective.

In the case that dot spacers 140 arranged in lines between upper conductive layers 112 are provided, it is not necessary to form dot spacers (not shown) on lower substrate 114. Alternatively, in the case that both of the dot spacers (not shown) on lower substrate 114 and dot spacers 140 are formed, it is necessary to arrange them so that they don't disturb touch of upper conductive layer 112 and lower conductive layer 115 when the touch panel is operated by, for example, collision of the both dot spacers.

Alternatively, it is acceptable to form dot spacers arranged in lines between belt-shaped lower conductive layers 115. Each of the dot spacer projects upward further than lower conductive layers 115. This structure provides same effect as that shown in FIG. 18. Furthermore, dot spaces may be formed between upper conductive layers 112, and also between lower conductive layers 115. Also in this case, it is necessary to arrange them so that they don't disturb touch of upper conductive layer 112 and lower conductive layer 115 when the touch panel is operated.

As mentioned above, by using a touch panel having a simple configuration of the present embodiment, two pressed positions can be detected, and various operations can be carried out. This touch panel is useful mainly for operating various electronic equipments.

What is claimed is:

1. A method of detecting a press operation position on an upper substrate of a touch panel, the touch panel comprising:

the light-transparent upper substrate;

a plurality of belt-shaped upper conductive layers formed on a bottom surface of the upper substrate;

an upper resistive layer connecting the upper conductive layers at end portions of the upper conductive layers;

first and second upper electrodes respectively provided on ends of the upper resistive layer;

a light-transparent lower substrate;

a plurality of belt-shaped lower conductive layers formed on a top surface of the lower substrate, facing the upper conductive layers with a predetermined gap therebetween, and extending in a second direction intersecting a first direction in which the upper conductive layers extend, a lower resistive layer connecting the lower conductive layers at end portions of the lower conductive layers;

first and second lower electrodes respectively provided on ends of the lower resistive layer;

a frame-shaped spacer interposed between the upper substrate and the lower substrate, and dot spacers disposed at least one of between the upper conductive layers and between the lower conductive layers, the method comprising:

(A) applying a voltage to the ends of the lower resistive layer and measuring a voltage value at the first upper electrode and a voltage value at the second upper electrode, in a state where the upper conductive layers and the lower conductive layers are contacted with each other at a first press operation position and a second press operation position by pressing the first press operation position and the second press operation position of the upper substrate;
(B) detecting a position of the first press operation position in a direction in which the lower conductive layers are arranged, based on the voltage value at the first upper electrode measured in (A), and detecting a position of the second press operation position in a direction in which the lower conductive layers are arranged, based on the voltage value at the second upper electrode measured in (A);

(C) applying a voltage to the ends of the upper resistive layer and measuring a voltage value at the first lower electrode and a voltage value at the second lower electrode, in a state where the upper conductive layers and the lower conductive layers are contacted with each other at the first press operation position and the second press operation position by pressing the first press operation position and the second press operation position of the upper substrate; and (D) detecting a position of the first press operation position in a direction in which the upper conductive layers are arranged, based on the voltage value at the first lower electrode measured in (C), and detecting a position of the second press operation position in a direction in which the upper conductive layers are arranged, based on the voltage value at the second lower electrode measured in (C).

* * * * *